July 26, 1960 B. J. WARMAN 2,946,854

KEY SENDERS OF THE KIND USED IN AUTOMATIC TELEPHONE AND LIKE SIGNALLING SYSTEMS

Filed Nov. 5, 1956 3 Sheets-Sheet 1

July 26, 1960 B. J. WARMAN 2,946,854

KEY SENDERS OF THE KIND USED IN AUTOMATIC TELEPHONE AND LIKE SIGNALLING SYSTEMS

Filed Nov. 5, 1956 3 Sheets-Sheet 2

United States Patent Office 2,946,854 Patented July 26, 1960

2,946,854

KEY SENDERS OF THE KIND USED IN AUTOMATIC TELEPHONE AND LIKE SIGNALLING SYSTEMS

Bloomfield James Warman, Charlton, London, England, assignor, by mesne assignments, to Siemens Edison Swan Limited, London, England, a British company Filed Nov. 5, 1956, Ser. No. 620,501

Claims priority, application Great Britain Nov. 4, 1955

3 Claims. (Cl. 179—18)

Figure 1:
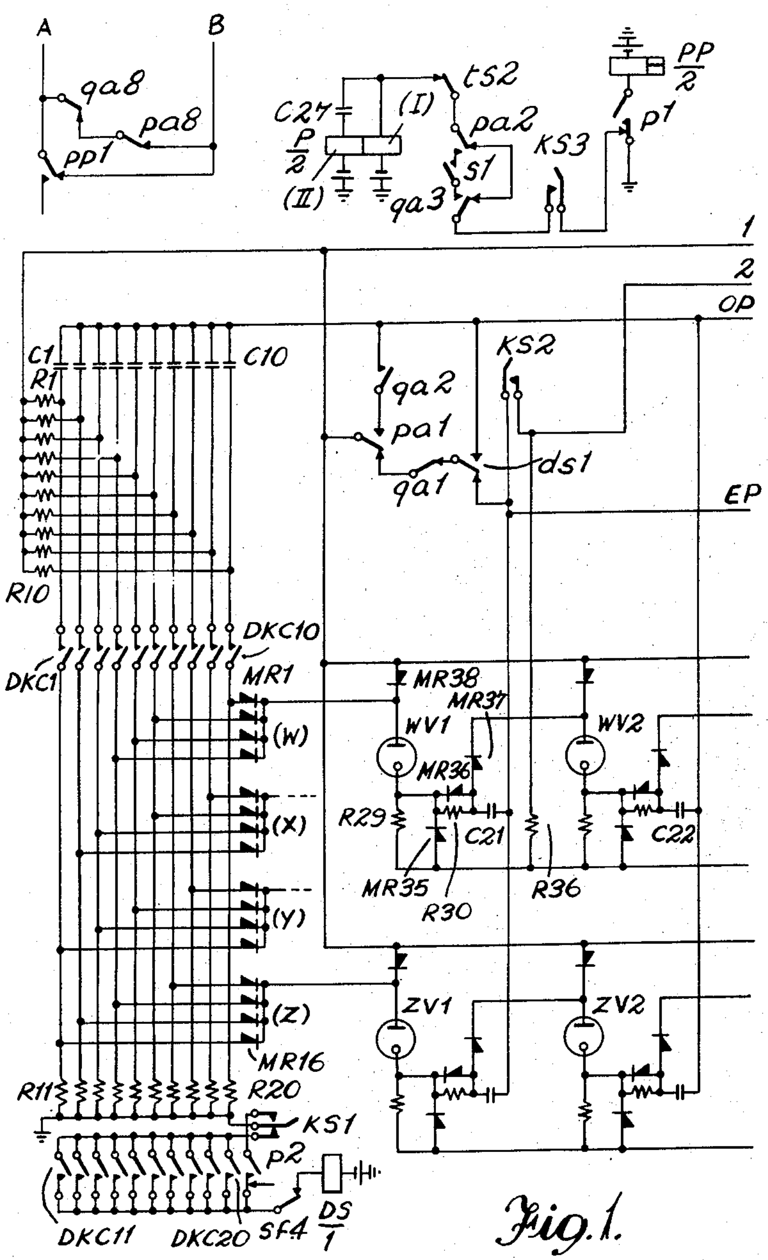

The present invention relates to keysenders of the kind used in automatic telephone and like signalling systems and is an improvement in or modification of the invention disclosed in the specification accompanying B. J. Warman's co-pending United States patent application Serial No. 356,053, now Patent No. 2,767,248.

A keysender as used in automatic telephone systems is arranged to receive digital information, usually in code form, from a set of digit keys at a manual operating position and to store this information and subsequently transmit it in the form of trains of impulses to bring about the setting up of a desired connection.

In the arrangement disclosed in the abovementioned patent, digital information in code form from the digit keys is stored in registers, there being a number of registers arranged in chain formation and a digit being first registered in the register at one end of the chain and then being progressed along the chain to the other, or head, end of the chain, and information stored in a register is transferred to the next register nearer the head end whenever such next register becomes vacant. The register at the head end of the chain is connected to an impulse counting and sending device for the transmission of impulses corresponding to the value of the digit stored at that time in the register at the head end of the chain. The registers comprise relays and impulse counting is performed by a relay counting chain.

In the present invention somewhat similar arrangements are provided but the individual link elements of the chains forming the digit storage registers and the counting chain are identical and are connected in the chains in identical manner, the only exception being the modifications necessary in the case of the particular link element or elements of a chain that is or are connected to furnish when requisite an output or outputs operative externally of the chain. Each link element consists of an assembly of components connected to form a circuit element of an electronic nature. A number of storage chains are used, one for each element of the code employed, and the code may consist of code elements used singly or in combination, the several storage chains being operative as a whole so that a code appears as a pattern of energised and unenergised link elements forming corresponding link elements in the several storage chains. The storage chains are so arranged that the digital codes keyed are inserted into the storage chains at one end thereof, the tail end, and are advanced up the chains as further digits are keyed or in response to a stepping operation until the first digital code keyed resides in the link elements at the other, or head, end of the storage chains. Associated with the code storage chains is an impulse counting chain arranged to count on a decimal basis, and the link elements at the head of the storage chains are connected to the impulse counting chain by means of a decoding network of rectifiers, resistors and capacitors such that when a "start sending" condition arises the code element or elements stored in the link elements at the head of the storage chains are caused to bring about the marking or energisation of the counting chain link element corresponding to the stored digit concerned, the impulse counting chain being then (in the general case) stepped, in synchronism with the transmission of impulses to a utilisation circuit, by impulses generated by local impulse generating means until the chain is counted out, whereupon the transmission of impulses and the stepping of the counting chain is suspended. The remaining digits stored in the storage chains are then stepped along the chains until the earliest one of the remaining digits reaches the link elements at the head of the chains whereupon counting operations are re-started for the transmission of the impulses of the said earliest one of the remaining digits, and so on. An interval between the cessation of impulse transmission in respect of one digit and the commencement of impulse transmission in respect of the next digit may be measured off by the impulse counting chain.

Figure 2:
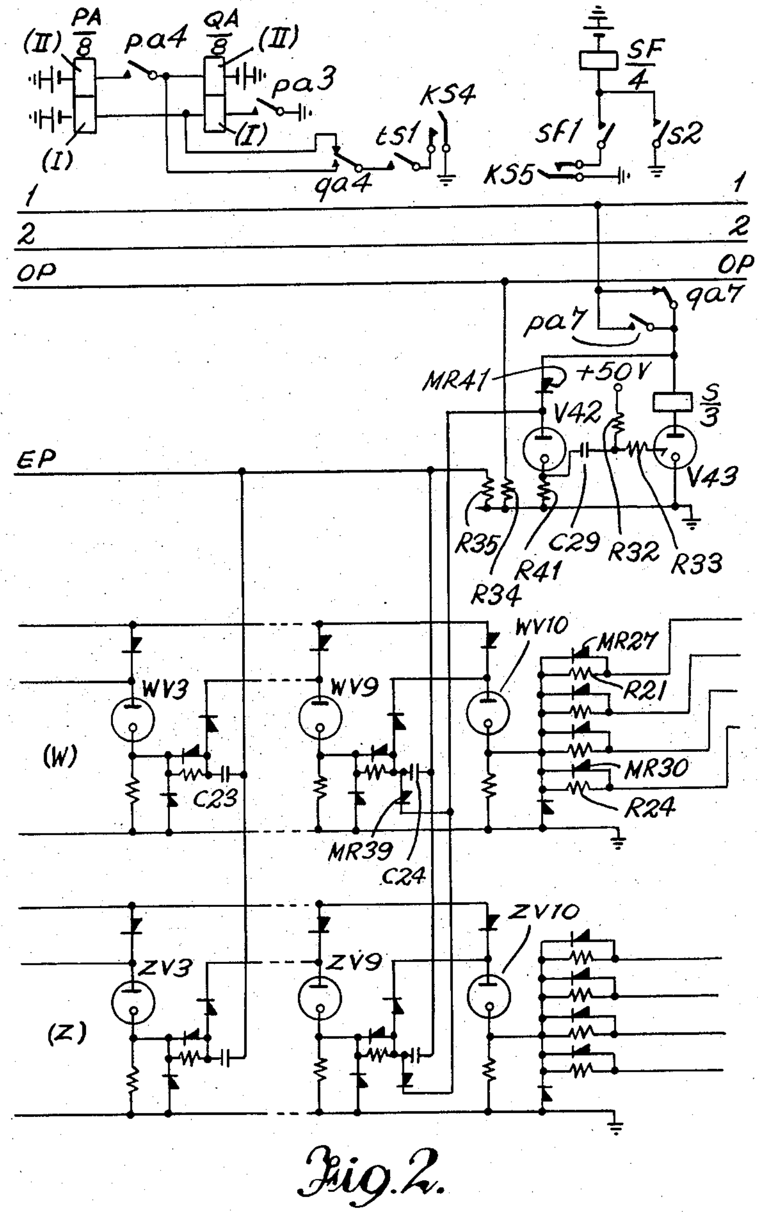
Figure 3:
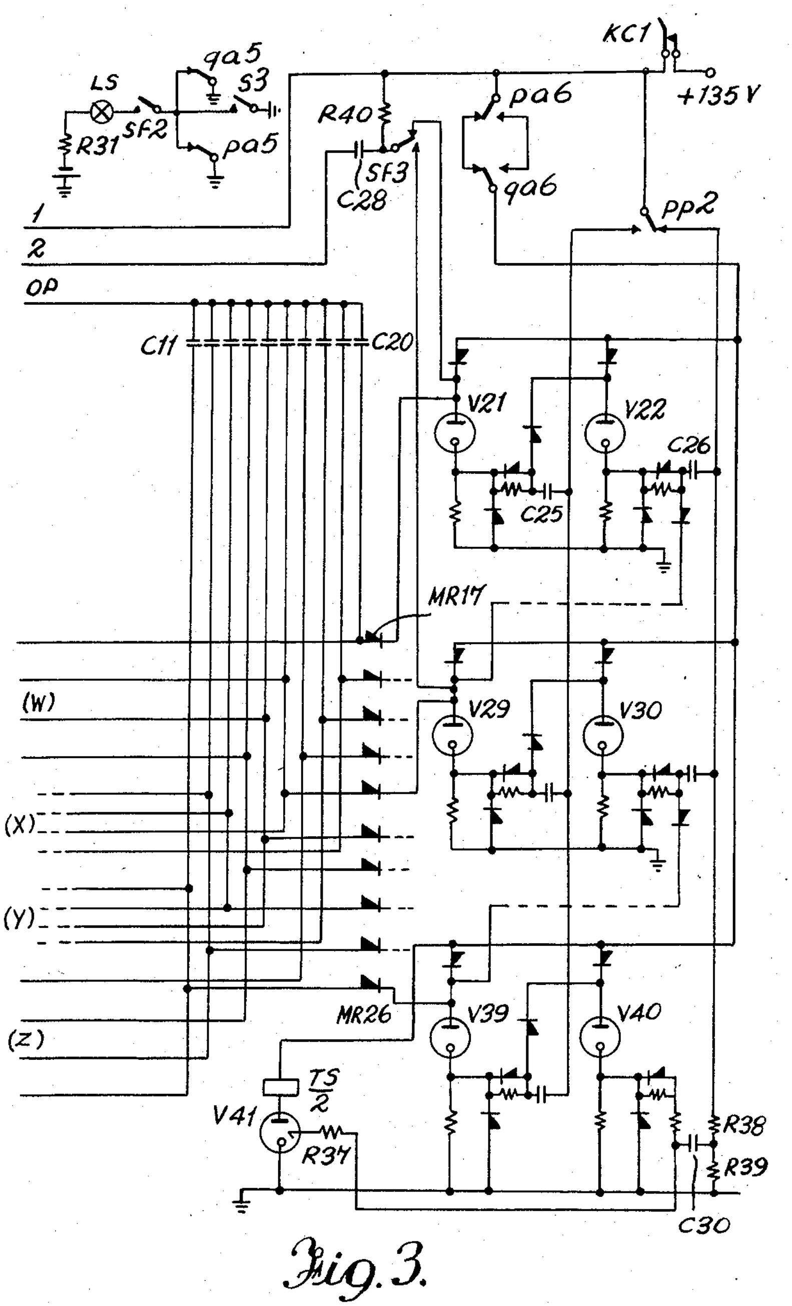

The features of the invention are exemplified in the specific circuit arrangements, constituting a keysender according to the invention, which will now be described with reference to the accompanying drawings. Figs. 1, 2, and 3 together constitute a circuit diagram of the keysender, and should be viewed with Fig. 2 placed to the right of Fig. 1, and Fig. 3 placed to the right of Fig. 2. The circuit diagram includes the contacts of a set of digit keys, of a start key, and of a cancelling key, and the connections to these contacts.

The keysender includes four storage chains, an impulse counting chain, and several controlling relays. The set of digit keys referred to would in practice be located at a manual operating position, and would be provided in the form of a digit key strip. The set comprises ten digit keys, and each of these keys has two "make" contacts. These contacts are shown on the left in Fig. 1, the row of "make" contacts DKC1 to DKC10 comprising one "make" contact of each key, and the row of "make" contacts DKC11 to DKC20 comprising the other "make" contact of each key. The pair of "make" contacts DKC1 and DKC11 belong to the "1" digit key, and so on, the last pair, DKC10 and DKC20, accordingly being the pair belonging to the "0" digit key. The start and cancelling keys would also be located at the manual operating position. The start key (herein referred to as key KS) has four "make" contacts KS2, KS3, KS4, and KS5, and a change-over contact KS1 and the cancelling key (herein referred to as key KC) has a "break" contact KC1. The four storage chains comprise one storage chain for each element of a four-element code employed for the purposes of digit storage. Herein, the letters "W," "X," "Y," and "Z" will where convenient and appropriate be employed to signify both the four elements of the code and apparatus pertaining to the respective elements. Of the four storage chains, then, one is a "W" storage chain, one is an "X" storage chain, one is a "Y" storage chain, and one is a "Z" storage chain. Each storage chain has ten link elements. The storage chains are not fully shown in the drawings, but are represented by the first, second, third, ninth, and tenth link elements of the "W" storage chain and of the "Z" storage chain. The first, second, third, ninth, and tenth link elements of the "W" storage chain include diodes WV1, WV2, WV3, WV9, and WV10 respectively, and the first, second, third, ninth, and tenth link elements of the "Z" storage chain include diodes ZV1, ZV2, ZV3, ZV9, and ZV10 respectively. The impulse counting chain, shown on the right in Fig. 3, has ten pairs of link elements similar to the link elements of the storage chains. The impulse counting chain is not fully shown. Of the ten pairs of link elements of this chain, only the first, fifth, and tenth (or last) pairs are shown, the first pair including diodes V21 and V22, the fifth pair including diodes V29 and V30, and the tenth pair including diodes V39 and V40.

Digits are received into storage from the digit key strip in code form, the code employed being the four-element one referred to, which is such that the different code signals corresponding to the values 1, 2, 3, 4, 5, 6, 7, 8, 9, and 0 of a digit are constituted by taking the four elements singly and in combination. The code signal condition produced when a digit key button is depressed is determined by the strappings via the isolating rectifiers MR1 to MR16 between the digit key contacts DKC1 to DKC10 and the "W," "X" "Y," and "Z" storage chains. Each keyed (coded) digit is stored initially in the first link element of each storage chain concerned, there being as already stated one storage chain associated with each element of the code, and is then progressively transferred link by link towards the other end of each storage chain concerned as subsequent digits are keyed. It is arranged that if all the digits representing a number to be stored do not result in progressing the code for the first keyed digit to the far end of the chain or chains concerned, pulses are delivered to the chains to bring about this result. The counting out of impulses representing the stored digits is performed on a decimal basis by the impulse counting chain, which is connected to the last link elements of the storage chains by a decoding network whereby the code stored in these end link elements marks an appropriate link element in the impulse counting chain via the particular one of the isolating rectifiers MR17 to MR26. Counting out is effected by the transferring the marking on the marked link element in the impulse counting chain to the next link element along the chain and then (in the general case) progressing this marking along the chain until it reaches the end of the chain in the direction of progression whereupon the chain is counted out, impulses being transmitted as transfer along the chain takes place.

All the link elements of all the chains are identical with the exception of the particular link element or elements of a chain that is or are connected to furnish when requisite an output or outputs operative externally of the chain, and it will suffice to describe in detail the operation of one link element only. Consider the first link element of the "W" storage chain; it consists of a cold cathode diode tube WV1, four rectifiers MR35 to MR38, two resistors R29 and R30, and a capacitor C21. The anode of the diode is connected so that it when appropriate has applied to it a firing potential constituted by what may be termed the marking signal from the digit key strip, and this anode is also connected via rectifier MR38 to a source of positive high tension voltage which provides a maintaining potential on the anode. The said positive high tension voltage may (as shown in the drawing) be 135 volts. The cathode of the diode WV1 is connected to earth via cathode resistor R29 in parallel with rectifier MR35, is connected via rectifier MR36 shunted by resistor R30 to one side of capacitor C21 and also to rectifier MR37 connected between that side of the capacitor and the anode of the diode WV2 in the next link element in the chain, the other side of the capacitor being connected to one of two pulse wires, of which more later. Rectifiers MR35 and MR36 are poled so as to provide a high resistance to current flow through the diode and rectifier MR37 is poled so as to present a low resistance to current flow between the capacitor C21 and the anode of the diode WV2 in the next link element in the chain. Considering now the two pulse wires just mentioned; these are designated OP and EP in the drawings and the capacitors of the odd link elements in the storage chain (see for example capacitors C21, C23, and C24) are connected to the pulse wire EP and the capacitors (see for example capacitor C22) of the even link elements are connected to the pulse wire OP, and relay contact *ds*1 is arranged to connect the positive high tension voltage to each pulse wire alternately upon each operation of the relay DS. The pulse wires OP and EP are both connected to earth via their respective guard resistors R34 and R35. The firing of a link element diode is effected by applying a potential higher than that of positive high tension to its anode, the higher potential being obtained by adding the positive high tension voltage to the voltage of a previously charged capacitor. As regards the link element under consideration, when the link diode WV1 is fired to register a marking the link capacitor C21 is charged via resistor R30 to a potential representing the difference between that of the positive high tension voltage and the potential difference across the diode, and to transfer the registered marking to the next link element the positive high tension is applied to the pulse wire EP via contact *ds*1 at normal, so that this voltage is added to that of the link capacitor C21 and the resultant additive potential is applied via rectifier MR37 to the anode of the diode WV2 in the next link element as the firing potential for this diode. Moreover, the resultant potential from capacitor C21 is applied via rectifier MR36, which is poled to conduct to this potential to the cathode of diode WV1 thereby reducing the potential difference across diode WV1 to such a low value that this diode cannot maintain conduction and is consequently extinguished. The rectifier MR35 included in the link element serves to prevent the cathode of the diode WV1 from being driven negative with respect to earth to a degree sufficient to produce unwanted re-striking of the diode.

Considering now the operation of the circuit in detail, associated with each digit key is one of the capacitors C1 to C10 which in the quiescent condition are charged via the respective resistors R1 to R10 and key contact KC1 at normal from the high tension voltage source, the path to earth for the capacitors being completed via the pulse wire OP and its associated guard resistor R34. When a digit key button is depressed an operating circuit for relay DS is completed from earth, key contacts KS1 at normal, the particular operated one of the digit key contacts DKC11 to DKC20, contact *sf*4 normal, DS relay coil to negative battery, so that this relay operates. The depression of a digit key button also closes the associated one of the digit key contacts DKC1 to DKC10 thereby connecting a particular one of the capacitors C1 to C10 to diode WV1, or XV1 (the diode, not shown in the drawings, pertaining to the first link element of the 'X' storage chain), or YV1 (the diode, not shown in the drawings, pertaining to the first link element of the 'Y' storage chain), or ZV1, or some combination thereof, in accordance with the digit key button depressed and the strappings of the marking wires which strappings each include one of the isolating rectifiers MR1 to MR16. The actual code strappings for each decimal digit are as shown below:

| | |
|---|---|
| 1—YZ | 6—WX |
| 2—XZ | 7—Z |
| 3—XY | 8—Y |
| 4—WZ | 9—X |
| 5—WY | 0—W |

When relay DS operates its contact *ds*1 changes over to apply the positive high tension voltage, via key contact KC1, wire 1, contacts *pa*1 and *qa*1 at normal and the pulse wire OP, to the back of the charged capacitors C1 to C10 so that a particular one, or each of a particular pair, of these capacitors, according to the digit key depressed, applies to the associated first diode of the relevant storage chain a striking voltage, the magnitude of which is that of the voltage already existing across the charged capactior plus that of the positive high tension voltage. The link element capacitor, such as capacitor C21, in the, or each, first link element in which the diode is accordingly struck is charged to the potential existing across the cathode resistor such as R29 which potential is insufficient to fire the diode in the next link element of the same storage chain. When the pressed digit key button is released the relay DS releases and contact *ds*1 on restoring to normal removes the positive high tension voltage from the pulse wire OP and connects it to the pulse wire EP so that the high tension voltage is added to the voltage across any charged first link element capacitor such as capacitor C21 to produce an additive voltage which will fire the diode of the next link element of the same storage chain. This additive voltage also effects the extinguishing of the diode in the first link element concerned, as previously described. The registration of the code marking or markings representing the first keyed digit has thus been transferred to the second link elements of the storage chains and the first link elements are now ready to receive a further registration. When a digit key button is next depressed the diode or diodes in the pertinent first link element or elements is or are fired in the manner already described and the relevant link capacitor or capacitors such as capacitor C21 is or are charged. Furthermore, since one or more capacitors, such as capacitor C22, of the one or more second link elements containing the first registration code marking or markings will already be charged the re-application of the positive high tension voltage to the pulse wire OP will effect the transfer of the first registration code marking or markings from the pertinent second link element or elements to the corresponding third link element or elements, with the result that the capacitor or capacitors, such as capacitor C23, of the pertinent third link element or elements is or are charged. When relay DS releases on restoration of the pressed digit key button, the positive high tension voltage is disconnected from the pulse wire OP and connected to the pulse wire EP to transfer the second registration code marking or markings from the pertinent first link element or elements to the now normal corresponding second link element or elements, and to transfer the first registration code marking or markings from the pertinent third link element or elements to the corresponding fourth link element or elements. It will thus be seen that each time a digit key button is depressed each registered digit is transferred one step along the storage chains, and that such transfer also takes place when a digit key button is restored, connection of the positive high tension voltage to a pulse wire transferring a registration code marking on any link element capacitor connected to that wire one step along the relevant storage chain.

The number of digits keyed may or may not be such that the keying of all the digits in itself results in a registration code marking or markings reaching one or more last link elements at the head of the storage chains. Considering for the moment the case where the keying of all the digits does in itself result in a registration code marking being transferred to the last link element of a storage chain, the additive voltage (including the voltage across the capacitor, such as capacitor C24, in the ninth link element of the chain) which produces such transfer also effects, via the pertinent rectifier such as rectifier MR39, the striking of the diode V42 to indicate that the storage chains are full. The anode of diode V42 is connected via rectifier MR41 and contact *qa*7 to the source of positive high tension voltage, and the output voltage (due to the presence of the cathode resistor R41) at the cathode of this diode is applied via capacitor C29 and resistor R33 to the trigger of the three-electrode cold cathode tube V43 and in conjunction with the standing positive bias already applied to the trigger of tube V43 via resistor R32 is sufficient to cause this tube to strike. The said positive standing bias may (as shown in the drawing) have a value of 50 volts. When current flows through tube V43, relay S operates which in turn operates relay SF via contact *s*2. Upon the operation of relay SF, contact *sf*1 closes a point in a holding circuit for the relay, and contact *sf*4 on breaking disconnects relay DS to prevent further keying of code markings into the storage chains. The subsequent operation of the start key KS commences the counting out of digit impulses to line.

If the first keyed digit does not reach the head of the storage chains as a result of the keying of all the digits, then operation of the start key KS brings about the requisite transference of the registration code markings along the storage chains (to cause the first digit to reach the head of these chains) prior to the counting out of digit impulses to line. Of the contacts of the start key KS, the changeover contact KS1 disconnects the relay DS from the digit key contacts and connects it in series with a "make" contact *p*2 of an impulse generating relay P; contact KS2 is included to effect an inter-train pause in a manner to be described later; contact KS3 completes a circuit for the impulse generating relay P; contact KS4 prepares an operating circuit for a change-over circuit comprising relays QA and PA, the function of which will also be described later; and contact KS5 prepares a locking circuit for relay SF. Continuing for the moment with the consideration of the case where the first keyed digit does not reach the head of the storage chains as a result of the keying of all the digits, the two windings (I) and (II) of relay P are differentially connected as regards their energisation in parallel, so that when initially connected the relay does not operate until capacitor C27 becomes sufficiently charged to limit severely the current in winding (II) of the relay. When relay P operates, after a time determined by the capacitance of capacitor C27, contact *p*1 operates the auxiliary impulsing relay PP and opens a point in the operating circuit of relay P. Relay P does not immediately release because capacitor C27 drives current round the closed loop of the two windings in such a direction that both windings aid in holding the relay operated until the capacitor has discharged. When relay P releases, after a time determined by the capacitance of capacitor C27, contact *p*1 releases relay PP and again closes the operating circuit of relay P. This impulse generating action of relay P continues whilst the circuit of the relay remains completed for such action, and relay PP follows the operations and releases of relay P. Consequently, when the start key KS is operated contact *p*2, of the impulsing relay P, pulses relay DS and thereby effects the progression of the registration code markings in the storage chains towards the end of the chains until relay S is operated, in the manner previously described, to signify that the first registered digit has reached the head of the chains, whereupon relay DS is disconnected by the operation of relay SF.

Considering now the impulsing out of the digit impulses over the line wires A and B. Before impulsing out commences the impulse counting circuit makes an initial count without any transmission of digit impulses over the line wires A and B. This is done to achieve a more reliable circuit sequence since otherwise there would be two different conditions of start, one when a registration marking condition has reached the head of the storage chains, the other when the registration marking conditions are being progressed along the storage chains by means of the impulse generating relay P. The initial count is effected when the start key KS is operated. If the first registered digit is already at the head of the storage chains then an initial count of five only is made; this is arranged as follows. In this condition relay S has operated and contact *s*2 has operated relay SF. Contact *sf*3 changes over so that capacitor C28 is connected to the anode of diode V29 which is associated with the first link element of the fifth link element pair in the impulse counting chain. Capacitor C28 is pre-charged from the positive high tension voltage source via key contact KC1, resistor R40, wire 2, resistor R36 to earth, so that when the start key KS is operated and contact KS2 applies the positive high tension voltage behind capacitor C28 a voltage of sufficient magnitude to strike diode V29 is realised. As previously mentioned, operation of the start key KS also completes the circuit for the impulsing relay P via KS3. Consequently, when contact *pp*2 applies positive high tension voltage pulses alternately to the link element capacitors, such as capacitors C25 and C26, of each link element pair in the impulse counting chain the marking initially on diode V29 is progressed down the chain in the manner described for the storage chains until the diode V40 in the second link element of the last link element pair is fired to charge capacitor C30. The next positive high tension voltage pulse delivered with contact *pp*2 at normal is potential divided by resistors R38 and R39 and the resultant voltage across capacitor C30 and resistor R39 is applied via resistor R37 to the trigger of the three-electrode cold cathode tube V41 to fire it and the consequent flow of current through this tube operates relay TS.

The same result is obtained when the registration code markings are progressed to the head of the storage chains by the action of the impulse generating relay P but in this case the initial counting out is commenced from the first link element in the impulse counting chain since relay SF is normal when the start key is operated so that the firing voltage across capacitor C28 is applied to diode V21. The starting of counting at the first link element pair gives time for the transference of the registration code markings along the storage chains to the head thereof before relay TS is operated and prepares the impulsing to line circuit as described below.

Upon the operation of relay TS, contact *ts*2 disconnects the impulsing circuit of relay P, and contact *ts*1 operates relay PA of the change-over circuit on its operating winding (I). Relay PA prepares a holding circuit for itself via winding (I) of relay QA and contact *pa*3. Since the positive high tension voltage is applied to the diodes of the impulse counting chain and to the "end of count" relay TS via contacts *pa*6 and *qa*6, it follows that when relay PA operates as just mentioned, and contact *pa*6 changes over, the impulse counting chain is restored to normal and relay TS is released. Contact *pa*1 prevents the re-application of the positive high tension voltage via contact KS2 to capacitor C28 which would otherwise fire diode V29 again. The restoration of contact *ts*1 opens the operating circuit for relay PA which now holds via the operating winding (I) of relay QA and contact *pa*3, causing relay QA to operate. The positive high tension voltage is now reapplied to the impulse counting chain and relay TS via the operated contacts *pa*6 and *qa*6.

The operated contacts *pa*1 and *qa*2 apply the positive high tension voltage over pulse wire OP to one side of the capacitor C11 to C20 one or more of which are already charged according to the registration code marking or markings at the head of the storage chains. As a consequence of this application of the positive high tension voltage, the charge on each of the capacitors C11 to C20 which happens to be charged is in effect transferred to a corresponding capacitor of the impulse counting chain, to insert a marking into the impulse counting chain. Each last link element of a storage chain has four pairs of parallel-connected resistors and rectifiers such as the pair R21 and MR27 and the pair R24 and MR30, each pair corresponding to resistor R30 and rectifier MR36 in the typical link element previously described in detail. Each of the capacitors C11 to C20 is connected to one or a combination of the last links of the storage chains according to the code employed. Since in the specific embodiment being considered the code markings employed consist of four simple markings and six markings employing different combinations of two code elements, four of the capacitors C11 to C20 are each connected to a single link in the storage chains, and six of these capacitors are connected to different combinations of two links. For each of the code elements W, X, Y, and Z there is one of the capacitors C11 to C20 connected over a resistor-rectifier combination to the diode of the last link element of the relevant storage chain. Each of the remaining six of the capacitors C11 to C20 is connected over two such resistor-rectifier combinations, one in each of the last link elements of the two storage chains corresponding to the relevant combination of the code elements, to the diodes of these last link elements. From the description already given it will be apparent that registration of a code marking in a last link element of any storage chain will charge or tend to charge four of the capacitors C11 to C20, one of these four capacitors corresponding to a single code element and each of the remaining three corresponding to a two-element combination of code elements. If a charging current is fed to a capacitor (of the capacitors C11 to C20) corresponding to a two-element combination of code elements from only one of the two diodes such as WV10 concerned the cathode resistor of the remaining one of these two diodes acts as a shunt (in conjunction with the relevant resistor such as R21 associated with this cathode resistor) and prevents the capacitor from acquiring an effective charge. If, however, a capacitor (of the capacitors C11 to C20) is charged from the diodes of the last link elements of two storage chains there will be three of the capacitors C11 to C20 fully charged, one of these three corresponding to the two-element combination of code elements concerned and the remaining two corresponding respectively to the two individual code elements making up this two-element combination.

As previously mentioned, the impulse counting chain contains ten pairs of link elements. The first link element of each of these pairs is connected via the relevant one of the rectifiers MR17 to MR26 to the relevant one of the capacitors C11 to C20 at the head of the storage chains. The anodes of the diodes of the first link elements of each pair in the counting chain are connected to the ten capacitors C11 to C20 in such a manner that capacitors corresponding to single code elements are connected earlier in the counting chain then capacitors corresponding to two-element combinations of code elements, and the single code elements are employed to denote the digit values 0, 9, 8, and 7 and the two-element combinations of code elements are employed to denote the digit values 6, 5, 4, 3, 2, and 1 (see the table given earlier in this specification). Charges on the capacitors C11 to C20 represent the digit values 1, 2, 3, 4, 5, 6, 7, 8, 9, and 0 respectively and it can readily be seen from Figs. 2 and 3 that a marking in the "W" storage chain when progressed to the head of the chain, charges the capacitor representing the digit value 0 and tends to charge three other capacitors associated with the combinations WX, WY and WZ which represent the digit values 6, 5 and 4 respectively. Similarly, a marking in the "X" storage chain when progressed to the head of the chain, charges the capacitor representing the digit value 9 and tends to charge three other capacitors associated with the combinations WX, XY and XZ which represent the digit values 6, 3 and 2 respectively. Similarly, a marking in the "Y" storage chain, when progressed to the head of the chain, charges the capacitor representing the digit value 8 and tends to charge three other capacitors associated with the combinations WY, XY, and YZ which represent the digit values 5, 3, and 1 respectively, and a marking in the "Z" storage chain, when progressed to the head of the chain, charges the capacitor representing the digit value 7 and tends to charge three other capacitors associated with the combinations WZ, XZ, and YZ which represent the digit values 4, 2 and 1 respectively. What happens when a two-element registration marking condition reaches the head of the storage chains will now be made clearer by taking by way of example the specific case where a registration marking condition constituted by the combination WY reaches the head of the storage chains. In this specific case the markings charge the capacitors representing the digit values 0, 8 and 5 but fail to produce effective charges on the capacitors representing the digit values 6, 4, 3 and 1. As a consequence of the charging of the capacitors representing 0, 8 and 5, the diode in the first link element of each of the first, third and sixth pairs of link elements of the counting chain are eventually fired and counting out commences simultaneously at each of these three link elements and proceeds towards the last link element in the counting chain. It will be clear that in the case being considered the diode V40 of the last link element of the counting chain will be fired after counting has caused the markings in the counting chain to be progressed through five pairs of link elements, with the consequent transmission over the line wires A and B of the digit 5 corresponding to the two-element combination of code elements WY, and that since the counting chain is cleared down by removal of the positive high tension voltage before counting out recommences, the other markings applied to the counting chain have no effect on the counting. This is the reason why the two-element combinations of code elements are employed to represent the digit values 6, 5, 4, 3, 2, and 1.

When relay TS operates to signify the end of the count in respect of the first digit sent, contact *ts*1 applies earth via operated contact *qa*4 to hold relay QA on its holding winding (II) and release relay PA by passing current through its winding (II) which is connected to oppose winding (I). Contact *pa*4 disconnects winding (II) of relay PA once the relay is released in order to prevent re-operation of the relay on its winding (II) alone. Contact *pa*4 is made to have an early "make" action, in order to ensure that it is the last contact of relay PA to release and that there is therefore no possibility of interaction with contact *pa*3. When relay TS releases on removal of the high tension positive voltage at contact *pa*6, contact *ts*1 opens the holding circuit for relay QA so that this relay also releases. The changeover circuit has now reverted to its original condition and further repeated operation and release of contact *ts*1 will cause the cycle of operation of this circuit to be indefinitely repeated.

During the counting out of the impulse counting chain contacts *qa*8 and *pa*8 are in the operated condition so that the short circuit is removed from the line wires A and B, thus allowing contact *pp*1 to transmit the digit impulses to line. Furthermore, when sending of the impulses of a digit is about to take place, the registration code marking or markings at the head of the storage chains is or are removed on its or their transfer to the impulse counting chain, the relevant diode or diodes such as WV10 and ZV10 being extinguished when the operated contacts *pa*1 and *qa*2 apply the positive high tension voltage over pulse wire OP to one side of the capacitors C11 to C20. This application of the positive high tension voltage also serves to progress the remaining registration code markings in the storage chains one step towards the end adjacent to the impulse counting chain; and when relays PA and QA restore to normal at the end of the counting out the return of contacts *pa*1 and *qa*1 to normal applies the positive high tension voltage to the pulse wire EP to step the registration code markings a further step towards the end of the storage chains this latter step resulting in the next registration code marking or markings reaching the head of the storage chains.

Before the next digit impulses are counted out an inter-digit pause is counted out by the impulse counting chain. This is a count of five only since relay SF is held operated at key contact KS5 and therefore contact *sf*3 remains changed over to apply the firing potential via capacitor C28 to diode V29 in the counting chain. During this inter-digit count contacts *qa*8 and *pa*8 are at normal so that contact *pp*1 is short circuited thereby preventing the transmission of impulses to line. The circuit for the impulsing relay P during this inter-digit count is via contacts *pa*2 and *qa*3 at normal. Moreover, upon the release of relay PA at the end of the first digit sent, contacts *pa*7 and *qa*7 are both open together for a brief period, and effect the restoration to normal of tube V42, tube V43 and relay S, which are then re-fired and re-operated again (in the manner already described) when the next registration code marking or markings is or are stepped to the end of the storage chains.

This sequence of operations is continued until all the stored digits have been transmitted. When the storage chains are empty relay S fails to operate, and therefore the impulsing circuit for relay P is no longer completed over contact *s*1 whilst relays PA and QA are both operated, and no further impulses can be transmitted to line.

An indication that registration code markings are in the storage chains is provided by the lamp LS. When relay SF initially operates a circuit for the lamp is completed via contacts *s*3 and *sf*2, the circuit being subsequently maintained over contact *qa*5 or *pa*5 and being one including a series resistor R31. This lamp remains steadily alight during sending, because either relay PA or QA is operated whilst relay S is released all the time a digit remains in storage. When relay S fails to operate as the last inter-digit pause is started, the lamp LS goes out owing to contacts *pa*5 and *qa*5 and *s*3 all being open together, and so an indication is given that all the stored digits have been sent. After sending has finished the keysender is released by restoring the key KS. If it is desired to release the keysender before sending has finished the operation of the cancelling key KC will at contact *kc*1 disconnect the high tension voltage source from the circuit and thereby restore the keysender to normal.

What I claim is:

1. A multi-digit register sender of the kind used in telephone systems, comprising a plurality of signalling wires on which digits keyed by an operator for registration in the register sender appear as signals in multi-element code form there being one such wire for each element of the multi-element code employed, a plurality of storage chains one for each element of the multi-element code and each consisting of a plurality of storage devices connected in chain formation there being the same number of storage devices in each storage chain and the plurality of storage chains as a whole constituting a plurality of digit storage registers all connected in chain formation and each comprising one storage device in each storage chain, the register at one end of the chain of digit storage registers being an incoming register connected to said signalling wires and adapted to register digits it receives as signals in multi-element code form over these wires and in which each digit keyed for registration in the register sender is initially registered and the register at the other end of the chain being an outgoing register and there being a plurality of intermediate registers between said incoming register and said outgoing register, means operative on the keying of a digit for registration in the register sender to transfer the registration of each digit already stored in the chain of digit storage registers from the register in which the registration resides to the next succeeding register in order along the chain, means operative on the termination of the keying of a digit for registration in the register sender to transfer the registration of each digit then stored in the chain of digit storage registers from the register in which the registration resides to the next succeeding register in order along the chain, a utilisation circuit, impulse sending and counting means for sending a number of impulses over said utilisation circuit in accordance with a registration in said outgoing register in respect of a keyed digit, means for restoring said outgoing register upon the utilisation of a registration therein, and means for causing the registrations of the digits stored in the chain of digit storage registers to be advanced along the chain as the sending of digits in the form of trains of impulses over said utilisation circuit takes place, to bring the registrations of the stored digits to said outgoing register in turn to enable the sending operation to be performed in respect of each of these digits in turn.

2. A multi-digit register sender of the kind used in telephone systems, comprising a plurality of signalling wires on which digits keyed by an operator for registration in the register sender appear as signals in multi-element code form there being one such wire for each element of the multi-element code employed, a plurality of storage chains one for each element of the multi-element code and each consisting of a plurality of storage devices connected in chain formation there being the same number of storage devices in each storage chain and the plurality of storage chains as a whole constituting a plurality of digit storage registers all connected in chain formation and each comprising one storage device in each storage chain, the register at one end of the chain of digit storage registers being an incoming register connected to said signalling wires and adapted to register digits it receives as signals in multi-element code form over these wires and in which each digit keyed for registration in the register sender is initially registered and the register at the other end of the chain being an outgoing register and there being a plurality of intermediate registers between said incoming register and said outgoing register, means operative on the keying of a digit for registration in the register sender to transfer the registration of each digit already stored in the chain of digit storage registers from the register in which the registration resides to the next succeeding register in order along the chain, means operative on the termination of the keying of a digit for registration in the register sender to transfer the registration of each digit then stored in the chain of digit storage registers from the register in which the registration resides to the next succeeding register in order along the chain, start means operable by an operator for initiating sending operation of the register sender, means responsive to operation of said start means for causing, if the registration of the first of the digits to be sent has not already been transferred to said outgoing register prior to operation of said start means, the registrations of the digits stored in the chain of digit storage registers to be advanced along the chain until the registration of the first of the digits to be sent reaches said outgoing register, an impulse counting chain adapted to count on a decimal basis and consisting of a plurality of storage devices connected in chain formation, an impulse generating means, a utilisation circuit, transfer and decoding means responsive to operation of said start means for causing the registration in said outgoing register in respect of a keyed digit to bring to a marking condition the particular storage device of said impulse counting chain that is appropriate to this registered digit and for at the same time causing said outgoing register to be restored preparatory for further registration therein and means then operative for causing said impulse generating means to send impulses over said utilisation circuit, and to feed impulses to said impulse counting chain to advance said marking condition from storage device to storage device along this chain in correspondence with the sending of impulses over said utilisation circuit, until said marking condition is advanced to the last storage device in said impulse counting chain to signify that a number of impulses corresponding to the particular digit concerned have been sent over said utilisation circuit, means responsive to the bringing of the last storage device in said impulse counting chain to the marking condition for restoring this impulse counting chain to normal, and means for causing the registrations of the digits stored in the chain of digit storage registers to be advanced along the chain as the sending of digits in the form of trains of impulses over said utilisation circuit takes place, to bring the registrations of the stored digits to said outgoing register in turn to enable the sending operation to be performed in respect of each of these digits in turn.

3. A multi-digit register sender as claimed in claim 2 including means responsive to operation of said start means for causing said impulse counting chain to make an initial count, without any sending of impulses over said utilisation circuit, before the sending operation is performed in respect of the first of the digits to be sent, the time taken by said initial count being sufficient to ensure that the registration of the first of the digits to be sent has been advanced to said outgoing register before said transfer and decoding means is rendered operative in respect of this digit.

References Cited in the file of this patent

UNITED STATES PATENTS

| | | |
|---|---|---|
| 2,056,265 | Germanton | Oct. 6, 1936 |
| 2,638,506 | Bray et al. | May 12, 1953 |
| 2,730,568 | Reagan | Jan. 10, 1956 |
| 2,740,003 | Newby | Mar. 27, 1956 |
| 2,764,634 | Brooks et al. | Sept. 25, 1956 |